United States Patent [19]
Lindgren et al.

[11] Patent Number: 4,854,960
[45] Date of Patent: Aug. 8, 1989

[54] FOREHEARTH

[75] Inventors: Håkan Lindgren, Västerås; Jan O. Olsson, Hallstahammar, both of Sweden; Martin Knudsen, Moss; Knut Rönningen, Kambo, both of Norway

[73] Assignee: Kanthal AB, Norway, Sweden

[21] Appl. No.: 218,492

[22] Filed: Jul. 5, 1988

Related U.S. Application Data

[63] Continuation of Ser. No. 77,101, Jun. 8, 1987, abandoned.

[30] Foreign Application Priority Data

Jun. 6, 1986 [SE] Sweden ............................ 8602572

[51] Int. Cl.$^4$ .............................................. C03B 5/42
[52] U.S. Cl. ......................................... 65/346; 65/137; 65/337; 65/347; 65/374.12
[58] Field of Search ................ 65/337, 346, 347, 137, 65/374.11, 374.12

[56] References Cited

U.S. PATENT DOCUMENTS

| | | | |
|---|---|---|---|
| 2,255,578 | 9/1941 | Baker | 65/374.11 |
| 3,416,908 | 12/1968 | Goodwin et al. | 65/355 X |
| 3,592,623 | 7/1971 | Shepherd | 65/347 X |
| 3,633,890 | 1/1972 | Kozmin | 65/347 X |
| 4,655,812 | 4/1987 | Blumenfeld II | 65/347 X |
| 4,662,927 | 5/1987 | Blumenfeld I | 65/137 X |

FOREIGN PATENT DOCUMENTS

| | | |
|---|---|---|
| 102144 | 10/1965 | Denmark . |
| 0145427 | 6/1985 | European Pat. Off. . |
| 7810396-7 | 3/1984 | Sweden . |

Primary Examiner—Arthur Kellogg
Attorney, Agent, or Firm—Fleit, Jacobson, Cohn, Price, Holman & Stern

[57] ABSTRACT

A forehearth for transport of molten glass, characterized in that cooling surfaces of a material having a high heat conductivity, particularly a metallic material, are disposed in the roof of the forehearth. The metallic material may be an iron-chromium-aluminum alloy having fifteen to thirty percent by weight of chromium, three to twelve percent by weight of aluminum, and a balance of essentially iron.

24 Claims, 1 Drawing Sheet

FOREHEARTH

This is a continuation of application Ser. No. 077,101, filed June 8, 1987, now abandoned.

TECHNICAL FIELD

The present invention relates to the manufacture of glass products and, more particularly, to transport of molten glass.

BACKGROUND ART

By the manufacture of glass products, particularly glass packages in the shape of bottles and jars, it is important that the blanks that are fed to the forming machine are mutually similar as far as possible with regard to both weight, temperature and other properties. The glass mass is molten in a furnace and is withdrawn therefrom through a plurality of channels, so called forehearths. Here, the desired properties of the withdrawn glass should be secured, beyond all by an exact control and adjustment of the temperature of the glass mass.

To achieve the exact control of the temperature of the glass mass there must exist a possibility to both heat and chill the glass mass. This may be achieved in different ways. The heating may be achieved either by installation of burners in the walls of the forehearth for combustion of e.g. gas, or by electrical heating. In the last mentioned case the heating may be achieved by means of electrodes, mounted in the side walls of the forehearth to protrude into the glass mass and adapted to heat the glass by direct current passage through the glass mass between the electrodes, or by means of resistance elements which are suitably disposed above the glass mass. If the heating is to take place by combustion it is also necessary to provide the forehearth with means for admission of combustion air and exhaust of combustion gases.

A certain amount of cooling of the glass mass always takes place by conduction through the forehearth walls and through radiation to the roof and conduction therefrom. To achieve an additional cooling, which is often desirable, two principally different methods have been utilized, via, direct and indirect air cooling, respectively. On direct air cooling the cooling air is blown into the forehearth directly above the surface of the glass mass. This results in a comparatively good cooling, but the cooling effect is achieved primarily on the glass surface, which brings about a risk for skin forming on the surface.

Indirect cooling may be achieved by building in a plurality of cooling channels in the roof of the forehearth. In this way, however, rather low cooling effects are achieved due to the low heat conductivity of the high temperature resistant material from which the forehearth is constructed.

To improve the cooling effect forehearths with openings in the roof construction have been designed. These openings lead to channels for cooling air, and where the openings open into the cooling air channels the openings are covered by a lid of heat resistant material. A certain increase of the cooling effect has been achieved in this manner at the expense of a comparatively complicated design. Due to the viscosity of the glass mass and the cooling effect obtained through the bottom and the walls of the forehearth there results an uneven flow and temperature distribution over the cross-section of the forehearth. Very great variations may occur if this is not counteracted by either cooling in the middle of the forehearth or heating along along the side edges, or a combination thereof. To obtain this the above mentioned cooling channels or -openings may be placed essentially above the middle of the forehearth. The roof of the forehearth may be designed in such a manner that a plurality of channels are formed, and cooling air may be blown through these channels as desired. To achieve a heating, particularly of the side edges of the forehearth, designs may be made where the effect of combustion of e.g. gas is directed as far as possible towards the outer edges of the forehearth.

A further factor that has an influence on the temperature variations and the need for cooling and/or heating is the quantity of glass per time unit that is withdrawn through the forehearth. Here, great variations may occur in one and the same forehearth, depending on which particular product in under manufacture, and the production rate. The difference between the greatest and the least glass withdrawal rate may be a factor of five. This puts great demands on the possibility to change the cooling and the heating, respectively, within a broad interval. The proposed measures have been enough to diminish the temperature variations to a certain extent but, despite the described measures, the difference between the highest and the lowest temperature in a cross-section over the outlet of the forehearth may amount to 40° C. However, also this variation may be considered to be great, and gives rise to problems.

SUMMARY OF THE INVENTION

The object of the present invention has been to provide a forehearth for molten glass mass which is designed in such a manner that the temperature variations within the glass mass—measured in a cross-section over the outlet of the forehearth—are reduced considerably as compared to previously known designs.

Another object of the invention has been to provide a possibility to quickly control the conditions within the forehearth, and to control within a broad interval, to permit great variations of the glass withdrawal rate from the forehearth.

A still further object of the invention has been to maintain the outlet temperature constant also at a varying inlet temperature.

Thus, the present invention relates to a forehearth for molten glass material which is characterized in that there are disposed, in the roof of the forehearth, cooling surfaces adapted for forced cooling, which cooling surfaces comprise material of a high heat conductivity, particularly metallic material, which surfaces face the glass surface.

Preferably, the cooling surfaces form parts of cooling channels.

To achieve a proper distribution of the cooling effect the forehearth should preferably be provided with a plurality of mutually parallel, longitudinal cooling channels. By an individual control of the air flow through each one of these cooling channels it is also possible to control the cooling effect over different portions of the forehearth.

As compared to previously known cooling methods the use of cooling surfaces of a material having a high heat conductivity, especially metallic materials, offers many advantages. A considerably higher cooling effect may be achived for a given surface area due to the higher heat conductivity of the just mentioned materials, as compared to ceramic materials that have been used with previously known designs. The technical drawbacks that are inherent with direct air cooling are eliminated and, further, a considerably better heat economy is obtained.

Also as compared to other indirect cooling systems the now invented method offers considerable advantages, e.g. a quicker control, so that temperature fluctuations are avoided. Some figures will illustrate this condition. With a direct cooling by air the heat transport within the glass takes place predominantly by conduction, where the heat conductivity of the glass is about 2 W/m° C. By indirect cooling, where the heat transport takes place by radiation, the heat conductivity is about 75 W/m° C. Heat is then picked up not only from the surface but from all of the glass that can "see" the cooling surface. The temperature gradient from the glass surface to the cooling surface is then only a few degrees. By using a metallic material for the cooling surfaces an energy quantity of 100–150 kW/m² may be passed away whereas ceramic materials have values of about 10–15 kW/m².

At the inlet of the forehearth the molten glass mass has a temperature of between 1200° and 1300° C. This puts great demands on the metallic material which is to be subjected to the high temperatures in question. The material must inherently combine mechanical strength with oxidation resistance at the temperature in question. However, a certain oxidation of the material on the surface that faces the glass mass is unavoidable. Therefore, there always exists a risk for oxides of the metallic material to fall down into the glass. Therefore, it would not be permissible to pick metal alloys of such a composition that particles that fall down may discolour the glass. It may be mentioned, for instance, that small quantities of chromium give rise to a strong green colouring of otherwise uncoloured glass.

It has been found that alloys of FeCrAl, comprising 15 to 30% chromium and 3 to 12% aluminum, remainder essentially iron, possess the desired properties. Such alloys have been found to possess the required chemical and mechanical resistance, and the oxide that is formed on the surface, comprises aluminum oxide. Despite the high chromium content of the material there exists no risk for discolouring of the glass.

In a modification it is also conceivable to make the cooling surfaces of the material that has been disclosed in SE-B 7409758-5, viz. in the form of a recrystallized skeleton of silicon carbide having a low porosity, preferably infiltrated with e.g., molybdenum disilicide, $MoSi_2$.

Additional advantages are obtained if the above described cooling system is combined with an electric heating of the forehearth by means of electrodes in the walls of the forehearth and heating by direct current passage through the glass mass. This gives a possibility of heating with very small losses and under exactly controlled conditions. This also affords the possibility to heat either through direct current passage transverse to the flow direction of the forehearth or parallel to the flow direction along the edges.

At heating by direct current passage it is also advantageously possible to use so called composite electrodes, e.g. of the kind that are described in SE-B 7902653-0.

It has been conceived that the forehearth according to the invention, due to the construction of the cooling channels of a metallic material, permits the use of cooling air in the channels with considerably higher relative humidity than the ordinary ambient air, which has a very strong influence on the cooling effect at the same time as a very simple control possibility is achieved in that it is very simple, with regard to the control techniques, to vary the relative humidity.

BRIEF DESCRIPTION OF THE DRAWINGS

The invention will be disclosed in more details below with reference had to the accompanying drawings.

DETAILED DESCRIPTION

Figure 1:
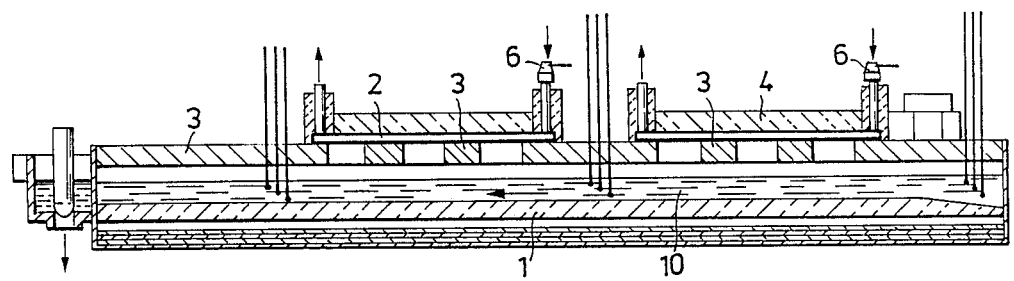
FIG. 1 illustrates a forehearth in a longitudinal section, i.e. in the flow direction of the glass mass as shown by arrows in the figure.
Figure 2:
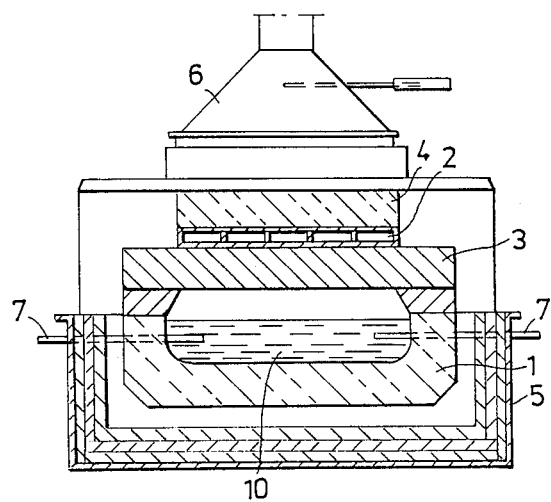
FIG. 2 illustrates a cross-section of the same forehearth, transverse to the flow direction.

The forehearth is constructed with a channel 1 of a ceramic material 4. The channel is surrounded by insulating material and an outer sheet metal wall 5. The cooling surfaces are formed by free surfaces of the cooling channels 2 facing the glass mass. The cooling channels 2 rest on a roof and beams 3 above the glass mass. In the figures two sets of cooling channels are shown, each one comprising five parallel channels having a common inlet box. This box contains control valves for individual control of each separate channel. The total air flow may be control by controlling the speed of the fan that blows the air. The glass mass that flows from the glass furnace to the forehearth has a temperature of between 1200° and 1300° C. The forehearth is also provided with a plurality of electrodes for heating. In FIG. 2 a pair of electrodes 7 are shown.

A forehearth of the illustrated kind may have a channel with internal dimensions of about 900 mm width and a height of about 300 mm. The thickness of the roof may be about 150 mm and the distance from the surface of the hot glass mass up to the cooling surfaces will then be abut 300 mm. The glass withdrawal from this forehearth may vary between 10 and 60 tons/day.

As compared to a corresponding forehearth with heating by combustion of gas and cooling by direct air flow above the glass surface a reduction of the temperature fluctuations by from 20° C. to 5° C. and a reduction of the energy consumption by about 85% is achieved. The exact control of the temperature and the temperature gradients are embodied in very constant properties of the glass material that leaves the forehearth. The withdrawal takes place in the shape of what may be termed drips (i.e., gobs) with a predetermined weight, varying between 40 and 500 grams. The constant conditions within the forehearth reduce considerably weight deviations from the desired value and the necessary number of adjustments of the outfeed device in order to maintain the desired value. The weight deviations do not in any case exceed 1% of the desired weight, and the number of adjustments of the outfeed device to maintain the weight varied between 0 and 3 times per shift of 8 hours.

In one embodiment of the invention the cooling channels are made wholly or partly from a multi-layer material. It is then possible to make the cooling channels from a material which is not suitable to be directly exposed to the hot glass mass but which possesses other desired properties. This material may be coated, entirely or on the surfaces that face the hot glass mass, with e.g. a FeCrAl alloy of the above mentioned composition. The coating may be brought about e.g. by rolling together metal sheets or by adding the FeCrAl alloy by thermal spraying of e.g. a nickel-chromium alloy to a surface.

In one practical example the cooling boxes have been dimensioned to permit each one of them to remove 90 kW at air speeds of about 25 and 30 m/sec. With a cross sectional area of the boxes of about 750×50 mm this would correspond to about 3600 m³ of air per hour and cooling box. The air quantity is control by means of an infinitely controlable fan motor. It may be found difficult to control the air flow finely when small quatities are concerned, for which reason both the cooling boxes and the fan are preferably provided with valves for a stepwise control of the air flow.

We claim:

1. A forehearth for transport of molten glass, comprising:
    forehearth channel means including a roof, for conducting molten glass passing beneath said roof between an inlet and an outlet; and
    a plurality of cooling surfaces of an iron-chromium-aluminum alloy having fifteen to thirty percent by weight of chromium, three to twelve percent by weight of aluminum, and a balance of essentially iron, disposed in the roof of the forehearth channel means.

2. The forehearth of claim 1, characterized in that the cooling surfaces comprise portions of a plurality of cooling channels that run mutually parallel, longitudinally of the forehearth.

3. The forehearth of claim 2, further comprising a plurality of valves with each of the cooling channels being provided with a different one of said valves for individual control of air flow through each one of the channels.

4. The forehearth of claim 3, further comprising the cooling surfaces extending longitudinally of the forehearth and being divided into at least two individually temperature controlable sections.

5. The forehearth of claim 3, further comprised of means for controlling relative humidity of air in the air flow.

6. The forehearth of claim 1, characterized in that the cooling surfaces comprise a multi-layer material with areas of the surfaces facing the molten glass being made of said iron-chromium-aluminum alloy.

7. The forehearth of claim 1, further comprising a plurality of electrode means disposed in said forehearth channel means, for electrical heating of the molten glass by direct passage of current through the molten glass.

8. The forehearth of claim 1, further comprising means for controlling the temperature of the glass mass by cooling said cooling surfaces.

9. A forehearth for transport of molten glass, comprising:
    forehearth channel means having longitudinal lengths including a roof for conducting molten glass passing beneath said roof between an inlet and an outlet; and
    a plurality of cooling channel sections running serially along successive longitudinal lengths of said forehearth channel means, said cooling channel sections each having cooling surfaces disposed in said roof and exposed to said molten glass comprising an iron-chromium-aluminum alloy.

10. The forehearth of claim 9, further comprised of said iron-chromium-aluminum alloy consisting essentially of from fifteen to thirty percent by weight of chromium, three to twelve percent by weight of aluminum, and a balance of said alloy being essentially iron.

11. The forehearth of claim 10, further comprised of said cooling channel sections being formed by successive lengths of said cooling channels with each of said successive lengths being individually temperature controllable and extending longitudinally along a fraction of said forehearth channel means.

12. The forehearth of claim 11, further comprising a plurality of valve means, each of said valve means being connected to a different one of said cooling channels, for controlling flow of air through individual corresponding ones of said cooling channels.

13. The forehearth of claim 10, further comprising electrode means disposed within said walls of said forehearth channel means for heating molten glass within said forehearth channel means by direct current passage through the molten glass.

14. The forehearth of claim 13, further comprised of said electrode means being disposed to provide conduction of electrical current through the molten glass transversly to a direction of flow of the molten glass through said forehearth channel means.

15. The forehearth of claim 13, further comprised of said electrode means being disposed to provide conduction of electrical current through the molten glass parallel to a direction of flow of the molten glass through said forehearth channel means.

16. The forehearth of claim 9, further comprised of said cooling channel sections being formed by successive lengths of cooling channels with each of said successive lengths being individually temperature controllable and extending longitudinally along a fraction of said forehearth channel means.

17. The forehearth of claim 16, further comprising a plurality of valve means, each of said valve means being connected to a different one of said cooling channels, for controlling flow of air through individual corresponding ones of said cooling channels.

18. The forehearth of claim 9, further comprising electrode means disposed within said walls of said forehearth channel means for heating molten glass within said forehearth channel means by direct current passage through the molten glass.

19. The forehearth of claim 18, further comprised of said electrode means being disposed to provide conduction of electrical current through the molten glass transversly to a direction of flow of the molten glass through said forehearth channel means.

20. The forehearth of claim 18, further comprised of said electrode means being disposed to provide conduction of electrical current through the molten glass parallel to a direction of flow of the molten glass through said forehearth channel means.

21. A forehearth for transport of molten glass, comprising:
    forehearth channel means having a roof, side walls, an inlet and an outlet, for enabling passage of molten glass between said inlet and outlet;
    a plurality of cooling channel sections running serially along successive longitudinal lengths of said forehearth channel means, said cooling channel sections each having cooling surfaces disposed in said roof and made of an iron-chromium-aluminum alloy consisting essentially of from fifteen to thirty percent by weight of chromium, three to twelve percent by weight of aluminum, and a balance of said alloy being essentially iron;

a plurality of cooling channel sections running serially along successive longitudinal lengths of said forehearth channel means, said cooling channel sections each having cooling surfaces disposed in said roof and made of an iron-chromium-aluminum alloy consisting essentially of from fifteen to thirty percent by weight of chromium, three to twelve percent by weight of aluminum, and a balance of said alloy being essentially iron;

a plurality of control means each associated with a different one of said cooling channel sections, for individually controlling air flow through said cooling channel sections; and electrode means disposed within said forehearth channel means, for providing electrical current passage through the molten glass within said forehearth channel means.

22. The forehearth of claim 21, further comprised of said electrode means being disposed to provide conduction of electrical current through the molten glass transversly to a direction of flow of the molten glass through said forehearth channel means.

23. The forehearth of claim 21, further comprised of said electrode means being disposed to provide conduction of electrical current through the molten glass parallel to a direction of flow of the molten glass through said forehearth channel means.

24. The forehearth of claim 21, further comprised of means associated with each of said cooling channel sections, for controlling relative humidity of air flowing through said cooling channel sections.

* * * * *